W. F. McCARTY.
DRILL PRESS.
APPLICATION FILED FEB. 15, 1918.

1,303,089.

Patented May 6, 1919.
8 SHEETS—SHEET 1.

WITNESSES

INVENTOR
William F. McCarty
BY
ATTORNEYS

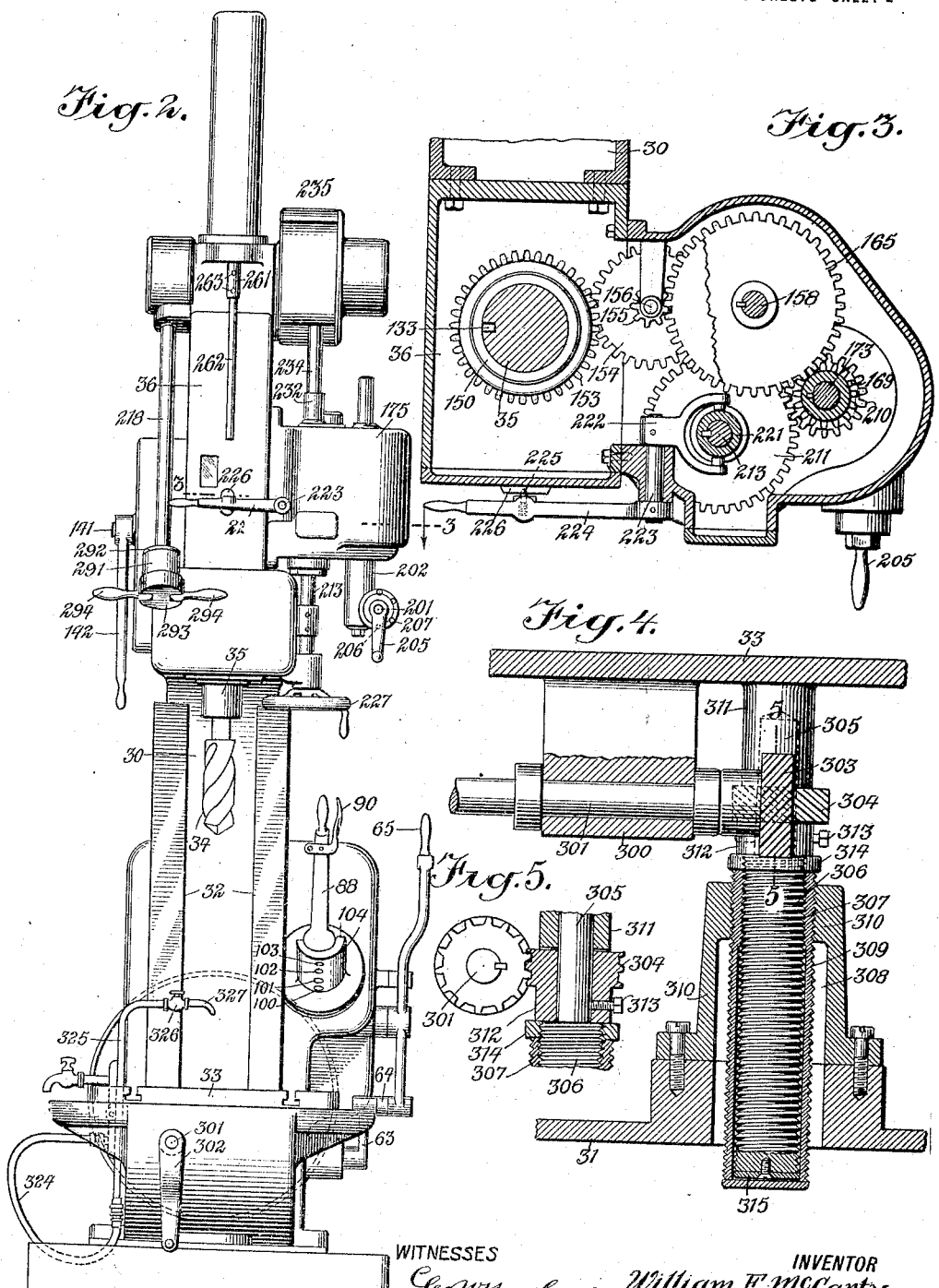

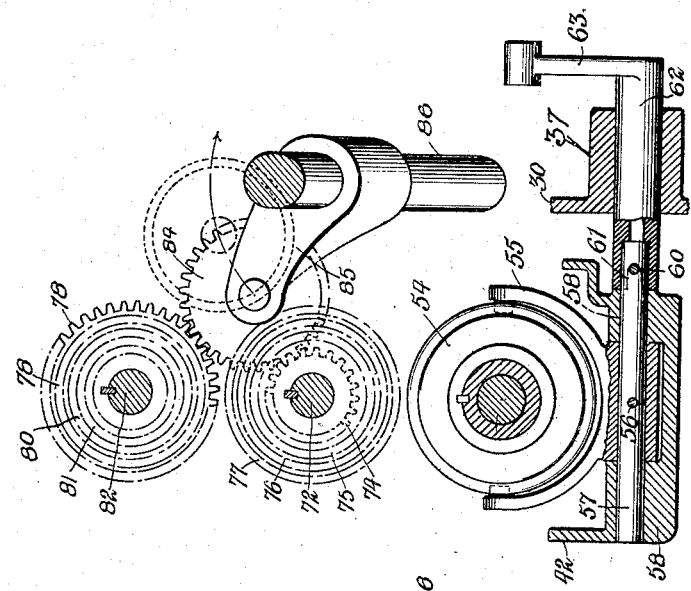

W. F. McCARTY.
DRILL PRESS.
APPLICATION FILED FEB. 15, 1918.
1,303,089.
Patented May 6, 1919.
8 SHEETS—SHEET 4.
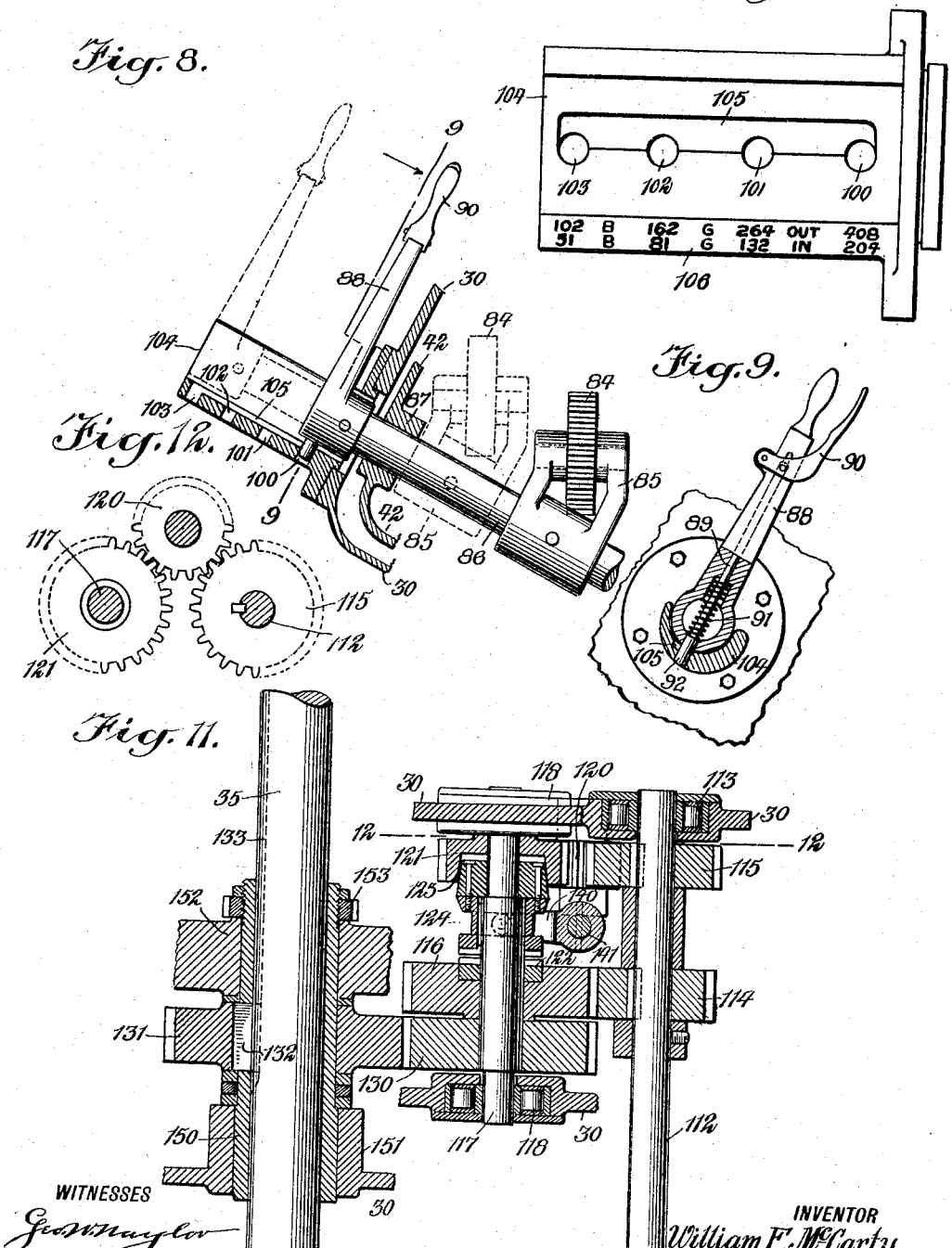

W. F. McCARTY.
DRILL PRESS.
APPLICATION FILED FEB. 15, 1918.

1,303,089.

Patented May 6, 1919.
8 SHEETS—SHEET 5.

WITNESSES

INVENTOR
William F. McCarty
BY
ATTORNEYS

W. F. McCARTY.
DRILL PRESS.
APPLICATION FILED FEB. 15, 1918.
1,303,089.
Patented May 6, 1919.
8 SHEETS—SHEET 6.
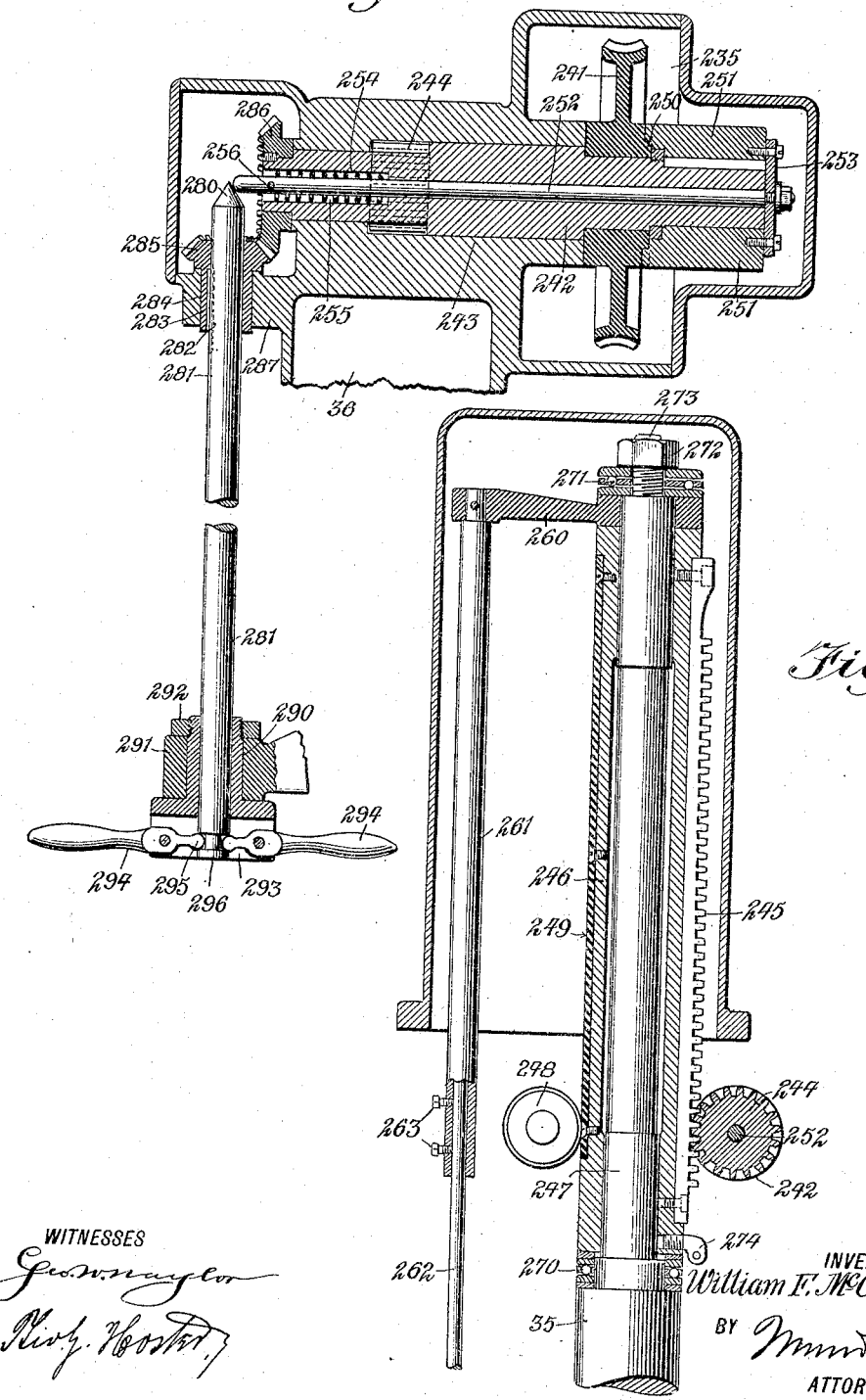
Fig.16.
Fig.17.
WITNESSES
INVENTOR
William F. McCarty
BY 
ATTORNEYS W. F. McCARTY.
DRILL PRESS.
APPLICATION FILED FEB. 15, 1918.
1,303,089.
Patented May 6, 1919.
8 SHEETS—SHEET 7.
Fig. 18.
Fig. 19.
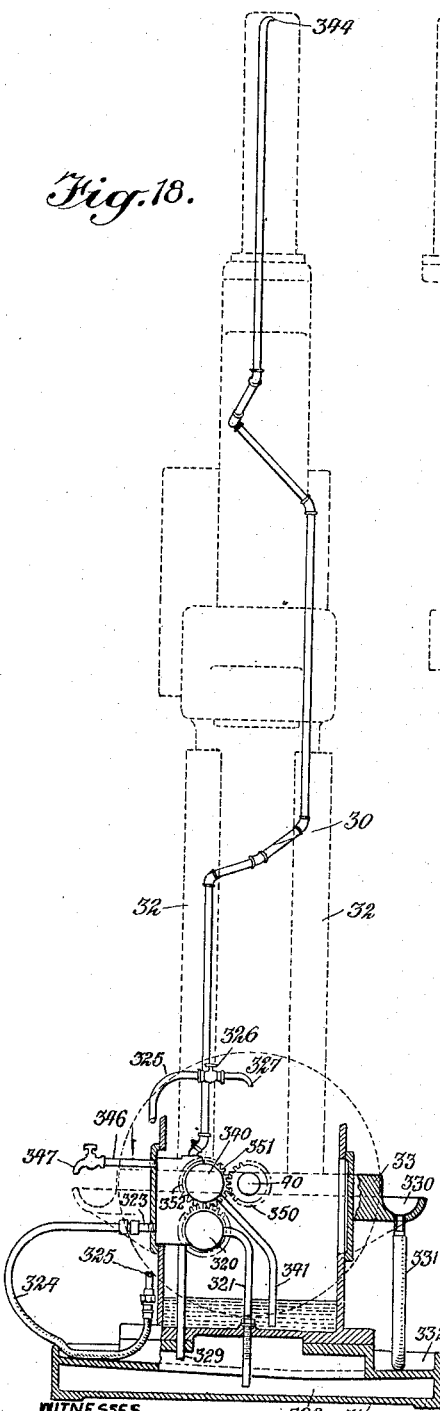
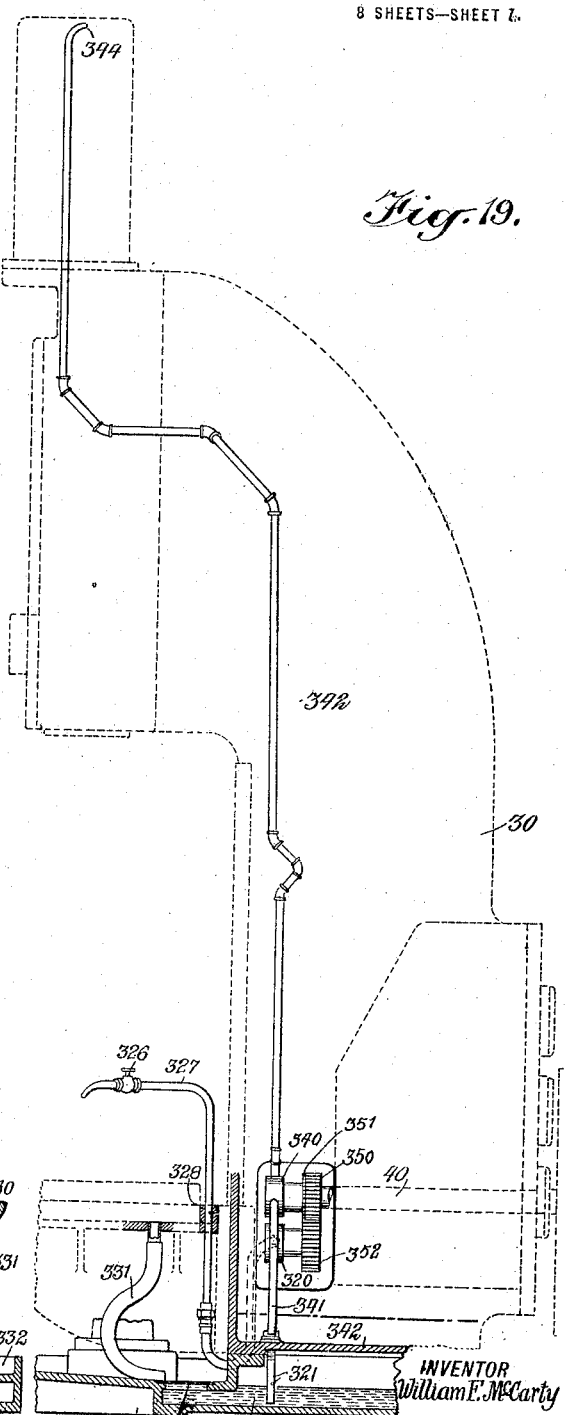
WITNESSES
INVENTOR
William F. McCarty
BY
ATTORNEYS

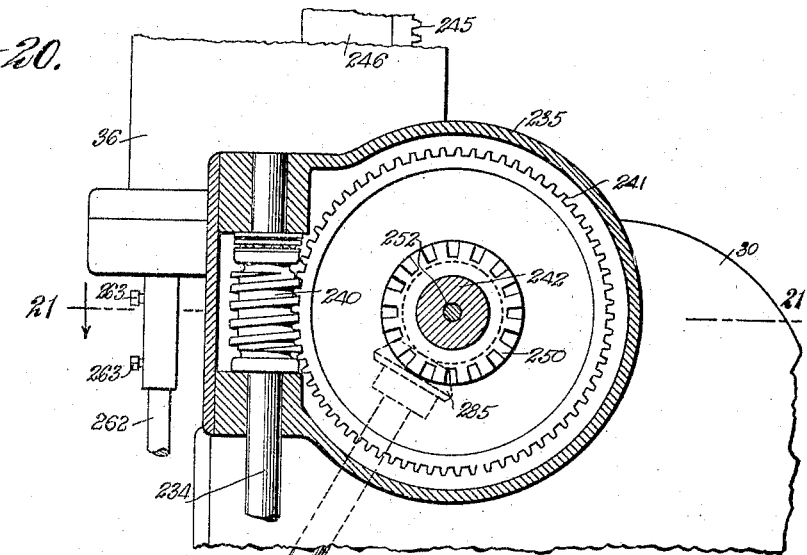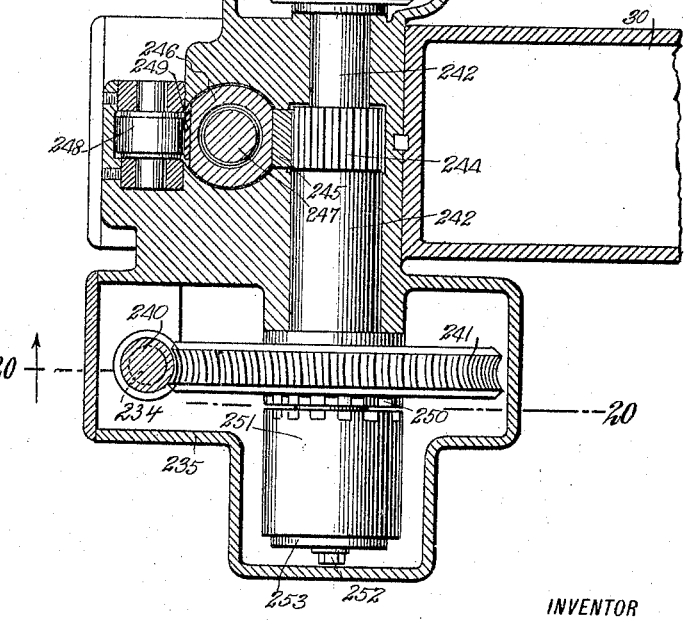

UNITED STATES PATENT OFFICE.

WILLIAM F. McCARTY, OF DEFIANCE, OHIO, ASSIGNOR TO DEFIANCE MACHINE WORKS, OF DEFIANCE, OHIO, A CORPORATION OF OHIO.

DRILL-PRESS.

1,303,089.      Specification of Letters Patent.      Patented May 6, 1919.

Application filed February 15, 1918. Serial No. 217,358.

*To all whom it may concern:*

Be it known that I, WILLIAM F. McCARTY, a citizen of the United States, and a resident of Defiance, in the county of Defiance and State of Ohio, have invented a new and Improved Drill-Press, of which the following is a full, clear, and exact description.

The object of the invention is to provide a new and improved drill press more especially designed for heavy service and arranged to permit the operator to readily change the speed of the drill spindle according to the nature of the work to be done at the time and without danger of stripping the teeth of the gear wheels of the speed changing gearing. Another object is to provide an automatic variable feed mechanism for the drill spindle to feed the drill spindle automatically and at a desired speed. Another object is to allow the operator to feed the drill spindle by hand whenever it is desired to do so. Another object is to insure automatic lubrication of the drill press and to supply the lubricant to the work and to the drill to insure proper drilling. Another object is to permit of readily detaching the variable speed gearing for the drill spindle from the main frame of the press for convenient inspection, repairs or other purposes. Another object is to provide a simple, manually controlled means for raising and lowering the work bed.

With these and other objects in view the invention consists of certain novel features of construction as hereinafter shown and described and specifically pointed out in the claims.

A practical embodiment of the invention is represented in the accompanying drawings forming a part of this specification, in which similar characters of reference indicate corresponding parts in all the views.

Fig. 2 is a front elevation of the same;

Fig. 3 is an enlarged sectional plan view of the same on the line 3—3 of Fig. 2;

Fig. 4 is an enlarged sectional side elevation of the manually controlled mechanism for raising and lowering the work bed;

Fig. 5 is a cross section of the same on the line 5—5 of Fig. 4;

Fig. 6 is an enlarged sectional side elevation of the variable speed driving gear for the drill spindle;

Fig. 7 is a cross section of the same on the line 7—7 of Fig. 6;

Fig. 8 is an enlarged side elevation, partly in section, of the shifting mechanism for variable speed driving gear;

Fig. 9 is a cross section of the same on the line 9—9 of Fig. 8;

Fig. 10 is a plan view of the retainer and guide for the shifting lever of the shifting mechanism shown in Figs. 8 and 9;

Fig. 11 is an enlarged sectional side elevation of the speed transmission gears for the drill spindle;

Fig. 12 is a sectional plan view of the same on the line 12—12 of Fig. 11;

Fig. 16 is an enlarged sectional side elevation of the manually controlled feed mechanism for the drill spindle, the section being on the line 16—16 of Fig. 1;

Fig. 17 is an enlarged sectional side elevation of the feed mechanism for the drill spindle and the trip rod;

Fig. 18 is a sectional front elevation of the oil feed;

Fig. 19 is a sectional side elevation of the same;

Fig. 20 is an enlarged sectional front elevation of the spindle feed mechanism on the line 20—20 of Fig. 21; and Fig. 21 is a sectional plan view of the same on the line 21—21 of Fig. 20.

Figure 1:
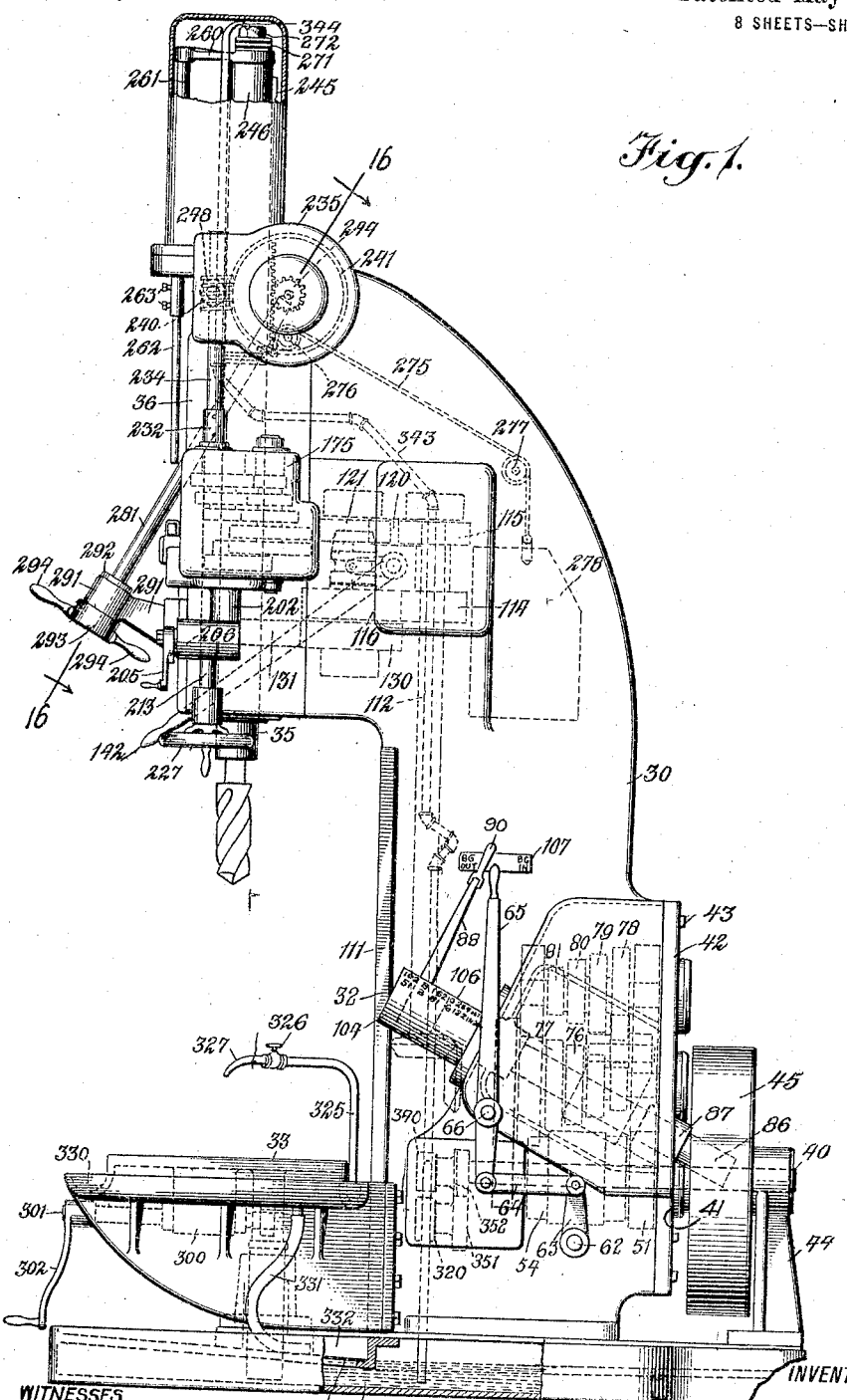
Figure 1 is a side elevation of the drill press.
Figure 13:
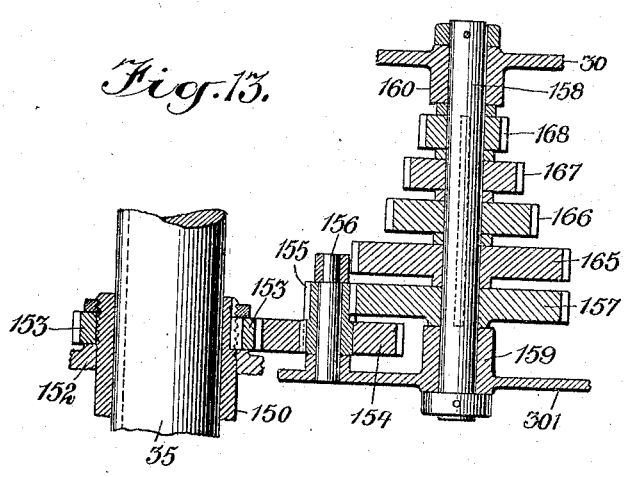
Fig. 13 is an enlarged sectional side elevation of the transmission gearing of the variable feed mechanism for the drill spindle.
Figure 15:
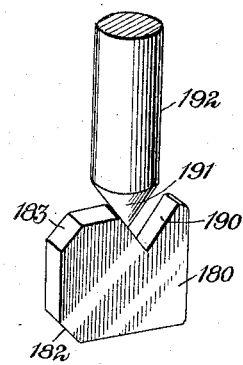
Fig. 15 is an enlarged perspective view of the movable key for the same.
Figure 14:
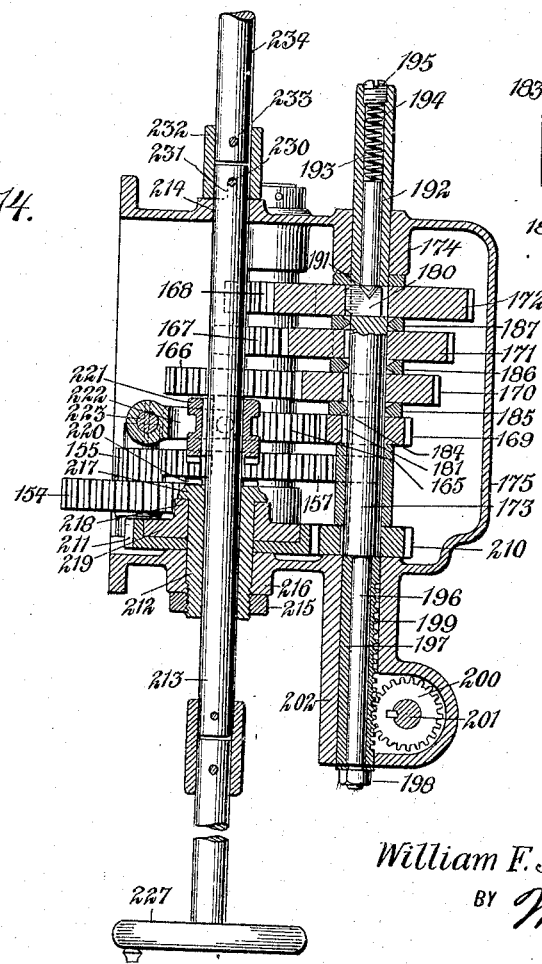
Fig. 14 is an enlarged sectional side elevation of the feed changing device of the feed mechanism for the drill spindle.

The drill press is mounted on a hollow main frame 30 supported on a suitable base 31. The main frame 30 is provided with vertically disposed guideways 32 on which is adjustably mounted a work bed 33 adapted to support the work to be drilled by a drilling tool 34 removably attached in the usual manner to the lower end of a drill spindle 35 mounted to turn and to slide up and down in suitable bearings arranged in the head 36 of the main frame 30. The drill spindle 35 is rotated at a variable speed by suitable mechanisms hereinafter more fully described, and driven from a main shaft 40 journaled in suitable bearings 41, preferably roller bearings, held in a back gear housing 42 containing a back gearing and removably secured by bolts or other fastening devices 43 to the main frame 30 at the lower portion thereof (see Figs. 1 and 6). The right hand end of the main shaft 40 extends to the outside of the housing 42, and the terminal of this outer end of the shaft 40 is journaled in a suitable bearing 44 removably attached to the base 31. On the outer end of the shaft 40 is secured a pulley 45 connected by a belt with other machinery for imparting a continuous rotary motion to the main shaft 40.

The back gearing is arranged as follows: On the main shaft 40 within the housing 42 are mounted to rotate loosely two gear wheels 50 and 51 of different diameters and provided with clutch members 52 and 53 adapted to be engaged by a double clutch 54 mounted to turn with and to slide lengthwise on the main shaft 40. Thus when the double clutch 54 is in engagement with the clutch member 52 then a rotary motion is transmitted from the main shaft 40 to the gear wheel 50, and when the double clutch 54 is shifted into engagement with the clutch member 53 then a rotary motion is transmitted from the main shaft 40 to the gear wheel 50, and when the double clutch 54 is shifted out of engagement with both clutch members 52 and 53 then it is in neutral or intermediate position and hence does not rotate either gear wheel 50 or 51. In order to shift the double clutch 54 lengthwise on the shaft 40 for the purpose mentioned, use is made of a shifting fork 55 engaging the double clutch 54 and secured by a pin or other fastening means 56 to a transverse rock shaft 57 journaled in suitable bearings 58 arranged on the bottom of the housing 42 (see Fig. 7). One end of the rock shaft 57 extends to the outside of the housing 42, and on this outer end is secured a pin 60 engaged by the fork end 61 of a shaft 62 mounted to rock and to slide lengthwise in a bearing 37 (see Fig. 7) forming part of the main frame 30. On the outer end of the shaft 62 is secured an upwardly extending arm 63 (see Figs. 1 and 7) connected by a link 64 with a hand lever 65 fulcrumed at 66 on the outside of the main frame 30. The hand lever 65 is within convenient reach of the operator to permit the latter to impart a swinging motion to the said lever 65 with a view to rock the shaft 62 which in turn rocks the shaft 57 to shift the double clutch 54 from the right to the left or from the left to the right for engaging the double clutch 54 with either the clutch member 52 or the clutch member 53, as above explained. When it is desired to remove the housing 42 and its contents from the main frame 30 for inspection, repairs or other purposes then the rock shaft 62 is pulled outwardly to disengage the inner end of this shaft from the rock shaft 57.

The normally loose gear wheels 50 and 51 are in mesh with gear wheels 67 and 68, of which the gear wheel 67 is keyed or otherwise fastened to the hub of a gear wheel 69 in mesh with a gear wheel 70, and the gear wheel 68 is in mesh with a gear wheel 71. The gear wheels 68 and 69 are mounted to rotate loosely on roller bearings mounted on a shaft 72 journaled in bearings 73 arranged in the back gear housing 42. The gear wheels 70 and 71 are keyed or otherwise secured on a shaft 82 journaled in suitable roller bearings 83 arranged in the housing 42. The gear wheels 67 and 68 are of different diameters, and the larger gear wheel 67 is in mesh with the smaller gear wheel 50, while the smaller gear wheel 68 on the shaft 72 is in mesh with the larger gear wheel 51 on the main shaft 40. By the arrangement described the shaft 82 can be rotated at a higher or lower rate of speed according to which of the gear wheels 50 or 51 is driven at a time from the main shaft 40 by the double clutch 54, as above explained. On the shaft 72 is secured a series of step gear wheels 74, 75, 76 and 77 and opposite the same is arranged a second set of step gear wheels 78, 79, 80 and 81 arranged in reverse order from the step gear wheels 74, 75, 76 and 77, as plainly shown in Fig. 6. The step gear wheels 78, 79, 80 and 81 are keyed or otherwise secured on the shaft 82. Either pair of gear wheels 74 78, 75 79, 76 80 and 77 81 is adapted to be engaged by an intermediate connecting gear wheel 84 journaled on a bracket 85 secured to an inclined shaft 86 mounted to rock and to slide lengthwise in bearings 87 (see Fig. 8) arranged on the housing 42. The upper end of the shaft 86 extends through the housing 42 and the main frame 30 to the outside thereof, and on the upper end of the shaft 86 is secured a hand-operated shifting and turning lever 88 under the control of the operator in charge of the machine. In the hand lever 88 is mounted to slide a locking rod 89 connected at its upper end with a hand lever 90 fulcrumed on the hand lever 88 to permit the operator to conveniently manipulate both levers 88 and 90. The locking rod 89 is pressed on by a spring 91 to normally project the lower end 92 beyond the hub of the hand lever 88 to engage this projecting end 92 with one of a series of openings 100, 101, 102 and 103 formed in a semicircular or trough-like retainer or guide 104 bolted or otherwise fastened to the outside of the frame 30. The openings 100, 101, 102 and 103 open into a groove or guideway 105 formed on the inner face of the guide 104 and extending to one side of the said openings, as plainly shown in Fig. 10. By this arrangement the operator having hold of the hand levers 88 and 90 can withdraw the end 92 of the locking rod 89 from the corresponding opening 100, 101, 102 or 103, and then impart a transverse swinging motion to the lever 88 to rock the shaft 86 with a view to move the intermediate connecting gear wheel 84 out of mesh with the corresponding pairs of step gear wheels 74 78, 75 79, 76 80 and 77 81. The lever 88 is now pushed to the right or left thus moving the shaft 86 lengthwise and with it the connecting gear wheel 84 until the latter is opposite a desired pair of the pairs of step gear wheels 74 78, 75 79, 76 80 and 77 81. The operator now swings the lever 88 forwardly and releases lever 90 to allow the end 92 of the locking rod 89 to engage the corresponding opening 100, 101, 102 or 103. The forward rocking movement of the lever 88 causes a rocking of the shaft 86 to engage the connecting gear wheel 84 with the corresponding pair of step gear wheels 74 78, 75 79, 76 80 and 71 81. On the outside of the guide 104 are arranged speed indicating characters 106 (see Figs. 1 and 10) to indicate the desired speed of the back gearing according to the position of the lever 65 and which position is indicated on a plate 107 attached to the frame 30, as shown in Fig. 1. From the foregoing it will be seen that by the arrangement described the intermediate connecting gear wheel 84 cannot be shifted into mesh with any one of the pairs of step gear wheels unless the said intermediate connecting gear wheel 84 is first moved out of mesh with the pair of step gear wheels it is in mesh with at the time so that stripping of the gear teeth of the gear wheels mentioned is completely avoided. It will be noticed that the speed changing mechanism described provides for eight different speeds according to the position of the double clutch 54 relative to the gear wheels 50 and 51 and that of the intermediate connecting gear wheel 84 relative to the pairs of step gear wheels 74, 78, 75, 79, 76, 80 and 77, 81.

The left-hand end of the shaft 72 extends to the outside of the housing 42 and on this outer end of the shaft 82 is secured a bevel gear wheel 108 in mesh with a bevel gear wheel 109 journaled in a roller bearing 110 mounted on the casing 42. The bevel gear wheel 109 is secured on the lower end of a vertically disposed power transmission shaft 112, journaled at its upper end in a suitable roller bearing 113 arranged on the main frame 30 (see Fig. 11). The shaft 112 extends within the main frame 30. On the upper portion of the power transmission shaft 112 are keyed or otherwise secured two gear wheels 114 and 115, of which the gear wheel 114 is in mesh with a gear wheel 116 mounted to rotate loosely on a reversing shaft 117 journaled in suitable roller bearings 118 mounted on the main frame 30 (see Fig. 11). The other gear wheel 115 is in mesh with an intermediate gear wheel 120 journaled on the main frame 30 and in mesh with a gear wheel 121 mounted to rotate loosely on the reversing shaft 117. The opposite faces of the gear wheels 116 and 121 are provided with clutch members 122 and 123 adapted to be engaged by a double clutch 124 mounted to turn with and to slide up and down on the reversing shaft 117. The clutch member 122 and its mate on the double clutch 124 are preferably of the positive type, while the clutch member 123 and its mate on the double clutch 124 are preferably of the friction type, as shown in Fig. 11. When the clutch 124 is in engagement with the clutch member 122 then the rotary motion of the power transmission shaft 112 is transmitted to the reversing shaft 117 by the gear wheels 114 and 116, and when the double clutch 124 is in engagement with the clutch member 123 then the reversing shaft 117 is rotated in a reverse direction from the power transmission shaft 112 by the gear wheels 115, 120 and 121. The shaft 117 is reversed for reversing the feed spindle 35 when doing tapping to run the tap out of the work.

The rotary motion of the reversing shaft 117 in either a forward or a reverse direction is transmitted to the drill spindle 35 and for this purpose use is made of a gear wheel 130 keyed or otherwise secured on the reversing shaft 117 and in mesh with a gear wheel 131 having a key 132 engaging a key slot 133 formed in the drill spindle 35. Thus when the reversing shaft 117 is rotated a corresponding rotary motion is given to the drill spindle 35 to rotate the latter either in a forward or a reverse direction and at any one of the eight speeds derived from the speed changing mechanism above described. The double clutch member 124 is engaged by a shifting fork 140 secured on a transversely extending rock shaft 141 journaled in suitable bearings arranged on the main frame 30. On one outer end of the rock shaft 141 is secured a handle 142 extending forwardly (see Figs. 1 and 2) to be within convenient reach of the operator in charge of the machine. On swinging the lever 142 upward the shifting fork 140 moves the double clutch 124 in engagement with the friction clutch member 123 to reverse the spindle 34 for running a tap out of the work, as previously explained, and on swinging the lever 142 downward the double clutch member 124 is moved into engagement with the positive clutch member 122 for rotating the spindle for drilling or tapping purposes.

In order to feed the drill spindle 35 automatically up or down and at a variable speed, use is made of the following automatic feed mechanism, special reference being had to Figs. 1, 2, 3, 4, 11, 13, 14, 15, 16 and 17: The drill spindle 35 extends through a sleeve 150 journaled in suitable bearings 151 and 152 arranged on the main frame 30, and the said sleeve 150 is engaged by the key 132 so that the sleeve rotates with the gear wheel 131 and the drill spindle 35 and the latter is free to slide up and down in the said sleeve. On the upper end of the sleeve 150 is secured a gear wheel 153 in mesh with a gear wheel 154 keyed or otherwise fastened to a pinion 155 mounted to rotate on a stud 156 attached to the main frame 30 (see Fig. 13). The pinion 155 is in mesh with a gear wheel 157 secured on a vertically disposed shaft 158 journaled in suitable bearings 159 and 160 attached to or forming part of the main frame 30. On the shaft 158 is secured a series of step gear wheels 165, 166, 167 and 168 in mesh with step gear wheels 169, 170, 171 and 172 mounted to rotate loosely on a slip shaft 173 mounted to slide up and down in a bearing 174 arranged on the top of a housing 175 attached to the main frame 30. In the slip shaft 173 is mounted to slide diametrically a key 180 adapted to engage a keyway 181 formed in each of the step gear wheels 169, 170, 171 and 172 to rotate the shaft 173 at the corresponding speed from the shaft 158 driven from the drill spindle 35, as above explained. The key 180 is provided at one side with inclines 182, 183 adapted to engage the inner V-shaped edges 184 of cam washers 185, 186 and 187 interposed between the corresponding step gear wheels 169 170, 170 171, and 171 172. The top of the key 180 is provided with a V-shaped notch 190 engaged by the conical lower end 191 of a pin 192 mounted to slide in a recess 193 formed centrally in the upper portion of the shaft 173. The pin 192 is pressed in a downward direction by a spring 194 held in the recess 193 and abutting with its upper end against a plug 195 screwed in the upper end of the shaft 173. The spring-pressed pin 192 serves to hold the key 180 in engagement with the keyway 181 of the corresponding step gear wheel 169, 170, 171 or 172 to cause such gear wheel to rotate the shaft 173 at a corresponding speed. When the slip shaft 173 is moved down or up, the corresponding bevel or incline 182 or 183 engages the wedge-shaped inner edge 184 of the corresponding cam washer 185, 186 or 187 thus retracting the key 180 from the corresponding keyway 181 to allow of moving the slip shaft 173 upward or downward as the case may be. It is understood that when the key 180 is retracted the spring pressed pin 192 is pushed upward and as soon as the key 180 is moved into register with the corresponding keyway 181 then the spring pressed pin 182 forces the key 180 outward into engagement with such keyway 181. It will be noticed that when the drill spindle 35 is rotated as above explained then a rotary motion is transmitted by the gear wheels 153 and 154, the pinion 155 and the gear wheel 157 to the shaft 158, and the rotary motion of the latter is transmitted by a variable speed to the shaft 173 according to which of the gear wheels 169, 170, 171 or 172 is locked to the slip shaft 173 by the key 180, it being understood that all the gear wheels 169, 170, 171 and 172 are simultaneously driven from the gear wheels 165, 166, 167 and 168 keyed on the shaft 158.

The lower end of the shaft 173 is provided with a reduced portion 196 on which is held a sleeve 197 by the use of a nut 198 screwing on the lower end of the reduced portion 196. The sleeve 197 is provided with a rack 199 in mesh with a pinion 200 secured on a transverse shaft 201 journaled in suitable bearings arranged on the housing 175. The sleeve 197 forms a continuation of the slip shaft 173 and is mounted to slide in a bearing 202 depending integrally from the housing 175. One outer end of the shaft 201 is provided with a handle 205 under the control of the operator in charge of the machine, and the handle 205 is provided with a spring pressed pin 206 adapted to engage any one of a series of recesses 207 formed in the face of the extension bearing 202 of the housing 175 (see Fig. 2). When the operator imparts a swinging motion to the handle 205 the slip shaft 173 is moved up or down according to the direction in which the handle 205 is turned at the time, and when the pin 206 engages a desired recess 207 then the key 180 is in register with the keyway 181 of the corresponding gear wheel 169, 170, 171 or 172. Thus the handle 205 is used by the operator for shifting the slip shaft 173 up or down and its position indicates which one of the gear wheels 169, 170, 171 or 172 is locked to the slip shaft 173 at the time.

On the lower end of the slip shaft 173 within the housing 175 is keyed or otherwise secured a pinion 210 in mesh with a gear wheel 211 mounted to rotate loosely on a sleeve 212 through which extends a shaft 213 journaled in its upper end in a bearing 214 formed on the top of the housing 175. On the lower end of the sleeve 212 screws a nut 215 against a bearing 216 formed on the bottom of the housing 175 and in which bearing 216 the sleeve 212 is mounted to turn. The upper end of the sleeve 212 is provided with a head 217 bearing against the hub 218 of a friction disk 219 engaging the upper face of the gear wheel 211 to connect the latter by frictional contact of the friction disk 219 with the sleeve 212. By the arrangement described a slip connection is had between the gear wheel 211 and the sleeve 212 to allow rotation of the gear wheel 211 without turning the sleeve 212 in case of undue strain incident to the drilling tool 34 encountering an undue resistance in the work. The top of the head 217 of the sleeve 212 is provided with clutch members 220 adapted to be engaged by a clutch 221 mounted to turn with and to slide up and down on the shaft 213. The clutch 221 is engaged by a shifting fork 222 secured on a transverse shaft 223 journaled in suitable bearings arranged on the housing 175. On the outer end of the shaft 223 (see Figs. 2 and 3) is secured a trip arm 224 provided with a spring pressed retaining pin 225 (see Fig. 3) adapted to engage a recessed boss 226 formed on the front of the head 36 to normally hold the arm 224 in the position shown in the drawings with a view to hold the clutch 221 in inactive position, that is, out of engagement with the clutch members 220 (see Fig. 14). When it is desired to start the automatic feed the operator swings the arm 224 upward to engage the clutch 221 with the clutch members 220 so that the rotary motion given to the sleeve 212 as above explained is transmitted to the shaft 213. When it is desired to throw out the automatic feed by hand, the operator swings the arm 224 downward to normal horizontal position, as shown in Figs. 2 and 3, to move the clutch 221 out of engagement with the clutch members 220 so that the further turning motion of the shaft 213 is stopped.

The lower outer end of the shaft 213 is provided with a hand wheel 227 under the control of the operator for turning the shaft 213 whenever it is desired to feed the drill spindle 35 by hand, as hereinafter more fully explained. The upper end of the shaft 213 is provided with a pin 230 engaged by the forked lower end 231 of a coupling sleeve 232 secured by a pin 233 or other fastening means to the lower end of a shaft 234 which thus forms an extension of the shaft 213. The coupling sleeve 232 rests on top of the bearing 214 and the upper portion of the shaft 234 extends into a housing 235 forming part of the head 36 (see Figs. 1, 20 and 21). On the shaft 234 within the housing 235 is secured a worm 240 in mesh with a worm wheel 241 (see Figs. 1, 16, 20 and 21) which is mounted to rotate loosely on a shaft 242 journaled in a suitable bearing 243 formed in the head 36. On the shaft 242 is formed or secured a pinion 244 in mesh with a rack 245 bolted or otherwise fastened to a sleeve 246 in which the upper reduced end 247 of the drill spindle 35 is mounted to rotate. In the head 36 of the frame 30 is journaled a thrust roller 248 located directly opposite the pinion 244 and engaging a wearing strip 249 attached to the sleeve 246

(see Fig. 17). The right-hand face of the worm wheel 241 is provided with a clutch member 250 normally engaged by a clutch 251 keyed or otherwise secured to the shaft 242. A clutch shifting rod 252 extends centrally through the shaft 242 and its right-hand end is secured to a plate 253 attached to the clutch 251. The left-hand portion of the clutch shifting rod 252 is pressed on by a spring 254 arranged within a recess 255 formed in the left-hand end of the shaft 242, and the other end of the spring 254 abuts against a stop pin 256 attached to the shifting rod 252. By the arrangement described the spring 254 presses the shifting rod 252 to the left to hold the clutch 251 normally in engagement with the clutch member 250 on the worm wheel 241. When the worm wheel 241 is rotated it transmits motion to the shaft 252 which by the pinion 244 engaging the rack 245 imparts an up and down sliding motion to the sleeve 246, and consequently to the drill spindle 35.

On the top of the sleeve 246 is held an arm 260 from which depends a trip rod 261 provided at its lower end with an adjustable extending rod 262 removably secured in place by screws 263 and adapted to engage the arm 224 whenever it is desired to automatically stop the feed of the drill spindle 35, it being understood that the desired swinging movement given to the raised arm 224 moves the clutch 221 out of engagement with the clutch members 220 to stop the shafts 213 and 234, as above described. The stopping of the shaft 234 causes a stopping of the worm 240 and its worm wheel 241 whereby the rotation of the shaft 242 and that of the pinion 244 ceases and likewise further downward feeding of the drill spindle 35. Between the lower end of the rack sleeve 246 and the drill spindle shaft 35 is arranged a ball bearing 270, and a similar ball bearing 271 is arranged on top of the worm 260 and is held in place by a nut 272 screwing on the upper threaded end 273 forming part of the upper end of the reduced portion 247 of the drill spindle 35, as plainly shown in Fig. 17. The lower end of the sleeve 246 is provided with an eye 274 on which is secured one end of a flexible connection 275, in the form of a cable, chain or the like, passing over guide pulleys 276 and 277 (see Fig. 1) journaled on the main frame 30. The other end of the flexible connection 275 supports a weight 278 to counterbalance the drill spindle 35.

In order to throw the clutch 251 out of engagement with the clutch member 250 and to allow of rotating the shaft 242 by hand, the following arrangement is made, special reference being had to Figs. 1, 2 and 16: The left hand end of the clutch shifting rod 252 is adapted to be engaged by the conical upper end 280 of an inclined shaft 281 connected near its upper end by a key groove 282 and a key 283 with the hub 284 of a bevel gear wheel 285 in mesh with a bevel gear wheel 286 secured on the left hand end of the pinion shaft 242. The hub 284 of the bevel gear wheel 285 is journaled in a suitable bearing 287 forming part of the head 36, as shown in Fig. 16. The lower portion of the shaft 281 is mounted to turn in a sleeve 290 mounted to turn in a bracket 291 attached to the head 36. The upper end of the sleeve 290 is engaged by a nut 292 seated on the top of the bracket 291 to hold the sleeve 290 in place. The lower end of the sleeve 290 terminates in a head 293 on which are pivoted two or more levers 294 projecting outwardly from the head to be grasped by the operator in charge of the machine. The inner ends of the levers 294 terminate in rounded off ends 295 engaging an annular groove 296 formed on the lower end of the shaft 281. Normally the parts are held in the position shown in Fig. 16 by the action of the spring 254 forcing the shifting rod 252 to the left thus holding the shaft 281 in lowermost position. When it is desired to disconnect the clutch 251 from the clutch members 250 the operator takes hold of the levers 294 and swings the same downward toward each other thus causing the shaft 281 to slide upward and in doing so its conical end 280 forces the shifting rod 252 to the right whereby the clutch 251 is moved out of engagement with the clutch members 250 on the worm wheel 241. The operator now turns the levers 294 thus turning the shaft 281 which by the gear wheels 285 and 286 turns the shaft 242 whereby the pinion 244 in mesh with the rack 245 imparts a quick upward or downward feeding movement to the drill spindle 35 according to the direction in which the shaft 281 is turned by the operator manipulating the levers 294. It is understood that when the levers 294 swing downward and rearward to the full extent, the left hand end of the clutch shifting rod 252 engages the side of the shaft 281 below the conical point 280 thus holding the shaft 281 in raised position. In order to allow the shifting rod 252 to return by the action of the spring 254 the operator must swing the levers 294 upward and outward to lower the shaft 281 until the left hand end of the rod 252 engages the conical point 280 and thus forces the shaft 281 and the levers 294 back to the normal position shown in Fig. 16.

In order to adjust the work bed 33 up or down on the guideways 32, the following arrangement is made, special reference being had to Figs. 1, 2, 4 and 5: The under side of the work bed 33 is provided with a bearing 300 in which is journaled a transverse shaft 301 provided at its forward end with a handle 302 under the control of the operator in charge of the machine. On the inner end of the shaft 301 is secured a spiral gear wheel 303 in mesh with a similar spiral gear wheel 304 secured on the upper reduced smooth end 305 of a screw rod 306 screwing in the interior thread 307 formed on a tubular screw 308 provided with an exterior screw thread 309 screwing in a nut 310 bolted or otherwise fastened to the base 31 of the drill press. The interior thread 307 of the tubular screw 308 terminates a distance from the top while the exterior screw thread 309 extends the entire height of the tubular screw 308. The extension 305 of the screw rod 306 fits into a boss 311 resting at its lower end on top of the spiral gear wheel 304 which in turn rests on a collar 312 fastened by a set screw 313 to the extension 305. When the work bed 33 is in lowermost position as shown in Fig. 4 then the collar 312 rests on top of a flange 314 formed on the upper end of the screw 308. The lower end of the screw rod 306 is provided with a stop plate 315 adapted to abut against the lower end of the interior screw thread 307 at the time the screw rod 306 is screwed up to its full extent on being turned by the spiral gear wheel 304 driven from the spiral gear wheel 303 attached to the shaft 301 turned by the operator. It will be noticed that when the screw rod 306 has reached the end of its upward movement then a further turning of the screw rod causes a turning of the tubular screw 308 which thus screws up in the nut 310 to raise the work bed 33 still farther. When the shaft 301 is turned in an opposite direction then the work bed 33 is lowered as the screw rod 306 is now turned in the opposite direction and screws downward in the screw 308 which latter eventually screws downward in the nut 310.

In order to supply a lubricating oil to the drilling tool 34 in the work on the work bed 33 the following arrangement is made, special reference being had to Figs. 1, 2, 18 and 19: In the lower portion of the main frame 30 is mounted a rotary pump 320 having its suction pipe 321 extending into an oil well 322 formed in the base 31. The outlet pipe 323 of the pump 320 extends through one side of the main frame 30 to the outside thereof, and the outer end of this outlet pipe 323 is coupled to one end of a hose 324 coupled at its other end to a vertical shank 325 of a faucet 326 having its discharge spout 327 adapted to deliver the oil to the work and the drilling tool 34. The shank 325 of the faucet 326 is held vertically adjustable in a clamp 328 arranged on the work bed 33 so as to move up or down with the same, the flexible hose 324 permitting such movement. When the pump is running oil is pumped from the oil well 322 to the faucet 326, the spout 327 of which directs the oil to the drill hole.

When it is desired to stop the oil feed the operator closes the faucet 326 without stopping the pump 320 which latter is provided with a supplementary outlet pipe 329 discharging the oil back into the oil well 322. Drip oil from the work passes into a drip pan 330 forming part of the work bed 33, and from the bottom of this drip pan 330 extends a hose 331 which discharges into a pan 332 forming part of the base 31 and arranged above the oil well 322 with which it is connected by a sieve or strainer 333 so that the drip oil is strained prior to passing back into the oil well 322.

In order to supply lubricating oil to the various mechanisms mounted on the main frame 30, the following arrangement is made: A pump 340 is arranged adjacent the pump 320 in the lower portion of the main frame 30 and the suction pipe 331 of this pump extends into an oil well 342 arranged on the main frame 30. The outlet pipe 343 of this pump 340 extends upwardly and terminates in a discharge spout 344 to deliver the oil to the top of the drill spindle 35 at the nut 272. The oil thus delivered at the highest point of and within the main frame 30 can readily pass to the various devices to properly lubricate the same, it being understood that the oil readily flows by its own gravity downward and is readily distributed by the rotating parts from one device to another so as to properly lubricate the same, it being understood that the oil eventually passes into the housing 42 by way of its open top to lubricate the speed changing device mounted therein. The pump 340 is provided with a branch pipe 346 terminating in a faucet 347 adapted to discharge oil into the oil well 332 whenever the valve 345 is closed and the faucet 347 opened and the feed of the oil to the different mechanisms is stopped. The pipe 343 can also be drained of its lubricating oil by way of the faucet 347 in case a change in the lubricating oil is contemplated. The two pumps 320 and 340 are simultaneously driven from the main shaft 40 and for this purpose the left hand end of this shaft is provided with a gear wheel 350 in mesh with a gear wheel 351 attached to the shaft of the pump 340. The gear wheel 351 is in mesh with a gear wheel 352 on the shaft of the pump 320 to rotate the pumps in unison. It is understood that when the drill press is running, the oil pumped by the pump 340 and discharged by the nozzle 344 onto the upper end of the drill spindle can readily lubricate the several mechanisms throughout the main frame 30 especially as the left hand side of the housing 175 and the top of the housing 42 are open for the entrance of the lubricating oil.

The operation is as follows:

The article to be drilled is fastened on the top of the work bed 33 in the usual manner, then the work bed 33 is raised or lowered according to the height of the article and the drill spindle 35 and with it the drilling tool is then quickly lowered by the operator manipulating the levers 294, as previously explained, until the point of the drilling tool 34 is adjacent to the article to be drilled. When this has been done the levers 294 are returned to their normal position and then the operator manipulates the lever 91 so as to provide the desired speed at which the drill spindle 35 is to be rotated, and then the operator turns the handle 205 to shift the slip shaft 173 up or down to set the feed mechanism to the desired speed. The operator next swings the arm 224 upward to engage the clutch 221 with the clutch members 220 to transmit the speed of the slip shaft 173 to the feed shafts 213 and 234. The operator now swings the lever 65 to the right or to the left to connect the double clutch 54 with either clutch members 52 or 53 to transmit the rotary motion of the continually rotating main driving shaft 40 to the speed changing mechanism connected with the drill spindle 35 to rotate the latter at the desired speed. As soon as the drill spindle 35 begins to rotate it transmits its rotary motion to the feed mechanism whereby the drill spindle 35 is fed downward to cause the drilling tool 34 to bore a hole in the article. At the time the hole is drilled the trip rod 262 engages the arm 224 thus swinging the same downward and thereby moving the clutch 221 out of engagement with the clutch members 220 to stop further downward feeding of the drill spindle 35. The operator next throws the lever 142 upward to disengage the double clutch 124 from the clutch members 122 and to engage it with the clutch members 123 thus reversing the rotary motion of the drill spindle 35. The operator now turns the handle 227 whereby the worm 240 and the worm wheel 241 are rotated in a reverse direction to move the drill spindle 35 upward until the drilling tool 34 is out of the hole drilled into the article. During this upward movement of the drill spindle the trip rod 262 disengages the arm 224. The operator next swings the handle 142 partly downward to disengage the double clutch 124 from the clutch members 123 thereby moving the clutch 124 into neutral position to stop the rotation of the drill spindle 35. The article is now shifted on the bed 33 for drilling another hole therein, or another article may be substituted and the above described operation repeated.

When it is desired to stop the rotation of the drill spindle 35 then the operator swings the lever 65 into neutral position with the double clutch 54 intermediate and out of engagement with the clutch members 52 and 53.

When it is desired to impart a quick feeding motion to the drill spindle 35 by hand then the operator manipulates the levers 294 correspondingly, as previously explained, and for a slow hand feeding of the drill spindle 35 the operator turns the hand wheel 227 as previously explained.

The drill spindle 35 can be completely freed from the variable feed mechanism on the operator manipulating the levers 294 to disengage the clutch 251 from the clutch members 250 thus disengaging the shaft 242 from the worm wheel 241. Now if a tap is used in the drill spindle 35 instead of a drilling tool, and the drill spindle is reversed after the hole has been tapped then the tap screws itself out of the hole and thereby moves the drill spindle 35 upward until the tap is out of the hole.

From the foregoing it will be seen that the drill spindle 35 can be rotated at any one of eight speeds according to the positions of the double clutch 54 and the intermediate connecting gear wheel 84 controlled by the levers 65 and 91. It will also be noticed that the power feed for the drill spindle is actuated from the latter and the power feed can be changed to different rates of speed on the operator correspondingly turning the handle 205 to shift the slip shaft 173 and its key 180 relative to the gear wheels 169, 170, 171 and 172. A slow hand feed is obtained by the operator manipulating the hand wheel 227 and a quick hand feed is had on the operator manipulating the levers 294, as above explained. It will be noticed that the back gear housing 42 and with it the main shaft 40 and the speed change gear mounted in the said housing can be readily detached from the main frame 30 it being necessary to disconnect the shaft 62 from the shaft 57 to raise the shaft 112 out of engagement with the gear wheel 109 and to remove the outside bearing 44 of the main shaft 40. It will further be noticed that by the arrangement described the entire speed change gear can thus be easily removed from the main frame and inspected by way of the open top of the housing 42. It will further be noticed that the housing 42 on account of being open at the top is readily filled with oil from above and retains this oil for the gearing to run therein.

Having thus described my invention, I claim as new and desire to secure by Letters Patent:—

1. In a drill press, a drill spindle, a main shaft provided with two loose gear wheels of different diameters and having clutch members on their opposite faces, a double clutch member mounted to turn with and to slide on the said main shaft, shifting means engaging the said double clutch member to connect the latter with either of the said loose gear wheels, two sets of step gear wheels, step gear wheel shafts on which the said sets of step gear wheels are secured, sets of gear wheels connected with one of the said step gear wheel shafts and provided with two gear wheels of different diameters, of which the largest one meshes with the smallest gear wheel on the said main shaft, and the smaller of the said two gear wheels meshes with the larger gear wheel of the main shaft, a transmission gear connecting the other step gear wheel shaft with the said spindle, a shaft mounted to turn and to slide and provided with a bracket, a connecting gear wheel journaled on the said bracket and adapted to mesh with any one pair of gear wheels of the said step gear wheels, and a shifting and turning lever connected with the said last-named shaft to turn and to shift the latter.

2. In a drill press, a drill spindle, a main shaft provided with two loose gear wheels of different diameters and having clutch members on their opposite faces, a double clutch member mounted to turn with and to slide on the said main shaft, shifting means engaging the said double clutch member to connect the latter with either of the said loose gear wheels, two sets of step gear wheels, step gear wheel shafts on which the said sets of step gear wheels are secured, sets of gear wheels connected with one of the said step gear wheel shafts and provided with two gear wheels of different diameters, of which the largest one meshes with the smallest gear wheel on the said main shaft and the smaller of the said two gear wheels meshes with the larger gear wheel of the main shaft, a transmission gear connecting the other step gear wheel shaft with the said spindle, a shaft mounted to turn and to slide and provided with a bracket, a connecting gear wheel journaled on the said bracket and adapted to mesh with any one pair of gear wheels of the said step gear wheels, a shifting and turning lever connected with the said last-named shaft, a locking device mounted on the said shifting and turning lever, and fixed guiding and retaining means engaged by the said shifting and turning lever and its locking means.

3. In a drill press, a drill spindle, a main shaft provided with two loose gear wheels of different diameters and having clutch members on their opposite faces, a double clutch member mounted to turn with and to slide on the said main shaft, shifting means engaging the said double clutch member to connect the latter with either of the said loose gear wheels, two sets of step gear wheels, step gear wheel shafts on which the said sets of step gear wheels are secured, sets of gear wheels connected with one of the said step gear wheel shafts and provided with two gear wheels of different diameters, of which the largest one meshes with the smallest gear wheel on the said main shaft and the smaller of the said two gear wheels meshes with the larger gear wheel of the main shaft, a transmission gear connecting the other step gear wheel shaft with the said spindle, a shaft mounted to turn and to slide and provided with a bracket, a connecting gear wheel journaled on the said bracket and adapted to mesh with any one pair of gear wheels of the said step gear wheels, a shifting and turning lever rigidly attached to the said last-named shaft, a lever bracket on which the said lever is fulcrumed, a locking rod mounted on the said shifting and turning lever, and a fixed guide having a longitudinal guideway and transverse holes leading into the said longitudinal guideway, the said locking rod being adapted to engage either of the said guideways.

4. In a drill press, a drill spindle, a driven transmission shaft parallel to the said drill spindle, a reversing shaft parallel to and intermediate the said drill spindle and the said transmission shaft, gear wheels secured on the said transmission shaft, gear wheels mounted to rotate loosely on the said reversing shaft and of which one is in mesh with one of the said gear wheels on the transmission shaft, an intermediate gear wheel in mesh with the other gear wheels on the said transmission and reversing shafts, clutch members on the opposite faces of the said loose gear wheels on the reversing shaft, a double clutch mounted to turn with and to slide on the said reversing shaft, manually controlled shifting means engaging the said double clutch to move the latter into or out of engagement with either of the said clutch members, and gear wheels in mesh with each other, one of the gear wheels rotating with the said drill spindle and the other being secured on the said reversing shaft.

5. In a drill press, a drill spindle, means for turning the said spindle, a sleeve rotating with the said drill spindle and in which the latter is mounted to slide, a sleeve gear wheel secured on the said sleeve, a pinion, a gear wheel rotating with the said pinion and in mesh with the said sleeve gear wheel, a shaft provided with a set of step gear wheels and a gear wheel in mesh with the said pinion, a second set of step gear wheels in mesh with the said first-named set of gear wheels, a slip shaft mounted to rotate and to slide in the direction of its length, the said second set of gear wheels being mounted to rotate loosely on the said slip shaft, cam washers intermediate the step gear wheels of the said second set of step gear wheels, each of the latter having a keyway and a key slidable transversely in the said slip shaft and adapted to engage the said keyways and the said cam washers to attach either of the step gear wheels of the said second set of step gear wheels with the said slip shaft, manually controlled means connected with the said slip shaft to shift the latter, and driving means connecting the said slip shaft with the said drill spindle to move the same up and down.

6. In a drill press, a drill spindle, means for turning the said spindle, a sleeve rotating with the said drill spindle and in which the latter is mounted to slide, a sleeve gear wheel secured on the said sleeve, a pinion, a gear wheel rotating with the said pinion and in mesh with the said sleeve gear wheel, a shaft provided with a set of step gear wheels and a gear wheel in mesh with the said pinion, a second set of step gear wheels in mesh with the said first named set of gear wheels, a slip shaft mounted to rotate and to slide in the direction of the length, the said second set of gear wheels being mounted to rotate loosely on the said slip shaft, cam washers intermediate the said step gear wheels of the said second set of step gear wheels, each of the latter having a keyway and a key slidable transversely in the said slip shaft and adapted to engage the said keyways and the said cam washers to attach either of the step gear wheels of the said second set of step gear wheels with the said slip shaft and a spring pressed retracting pin mounted in the said slip shaft and engaging the said key, manually controlled means connected with the said slip shaft to shift the latter, and driving means connecting the said slip shaft with the said drill spindle to move the same up and down.

7. In a drill press, a drill spindle, and a manually controlled variable power feed mechanism driven from the said spindle and connected therewith to feed the drill spindle at a desired rate of speed, the said feed mechanism having a slip shaft mounted to rotate and to slide lengthwise, a set of step gear wheels mounted to rotate loosely on the said slip shaft, cam washers intermediate the said step gear wheels, and each having a keyway and a key slidable transversely in the said slip shaft and adapted to engage the said keyways and the said cam washers to fasten either of the said step gear wheels to the said slip shaft, manually controlled means connected with the said slip shaft to shift the latter, and driving means connecting the said slip shaft with the said drill spindle to move the latter up and down.

8. In a drill press, a drill spindle and a manually controlled variable power feed mechanism driven from the said spindle and connected therewith to feed the drill spindle at a desired rate of speed, the said feed mechanism having a slip shaft mounted to rotate and to slide lengthwise, a set of step gear wheels mounted to rotate loosely on the said slip shaft, cam washers intermediate the said step gear wheels and each having a keyway and a key slidable transversely in the said slip shaft and adapted to engage the said keyways and the said cam washers to fasten either of the said step gear wheels to the said slip shaft, a spring-pressed retracting pin mounted in the said slip shaft and engaging the said key, manually controlled means connected with the said slip shaft to shift the latter and driving means connecting the said slip shaft with the said drill spindle to move the latter up and down.

9. In a drill press, a drill spindle, a rack on the drill spindle, a pinion in mesh with the said rack, a shaft provided with the said pinion, a power driven wheel mounted to rotate loosely on the said shaft and provided with a clutch member, a clutch slidable on and turning with the said shaft and engaging the said clutch member, a spring pressed shifting rod connected with the said clutch, a manually controlled shaft mounted to turn and to slide and terminating in a cam engaging the said shifting rod, and a gearing connecting the said first-named shaft with the said manually controlled shaft.

10. In a drill press, a drill spindle, a rack on the said drill spindle, a pinion in mesh with the said rack, a shaft provided with the said pinion, a power driven wheel mounted to rotate loosely on the said shaft and provided with a clutch member, a clutch slidable on and turning with the said shaft and engaging the said clutch member, a spring pressed shifting rod connected with the said clutch, a manually controlled shaft having a cam point engaging the said shifting rod, a bearing in which the said manually controlled shaft is mounted to turn in and to slide lengthwise, a fixed bracket in which said bearing is mounted to turn, and levers fulcrumed on the said bearing and connected with the said shaft to impart a sliding and a turning motion to the same.

WILLIAM F. McCARTY.

Copies of this patent may be obtained for five cents each, by addressing the "Commissioner of Patents, Washington, D. C."